United States Patent
Holmer et al.

(10) Patent No.: US 10,539,800 B2
(45) Date of Patent: Jan. 21, 2020

(54) FACE PLATE IN TRANSPARENT OPTICAL PROJECTION DISPLAYS

(71) Applicant: SAAB AB, Linkoeping (SE)

(72) Inventors: Anna-Karin Holmer, Joenkoeping (SE); Johan Zanden, Norrahammar (SE); Stefan Andersson, Habo (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/067,007

(22) PCT Filed: Jan. 5, 2016

(86) PCT No.: PCT/SE2016/050001
§ 371 (c)(1),
(2) Date: Jun. 28, 2018

(87) PCT Pub. No.: WO2017/119827
PCT Pub. Date: Jul. 13, 2017

(65) Prior Publication Data
US 2019/0025594 A1 Jan. 24, 2019

(51) Int. Cl.
*G02B 6/00* (2006.01)
*G02B 27/01* (2006.01)
(Continued)

(52) U.S. Cl.
CPC ....... *G02B 27/0172* (2013.01); *G02B 5/0278* (2013.01); *G02B 6/08* (2013.01);
(Continued)

(58) Field of Classification Search
CPC .... G02B 27/0172; G02B 5/0278; G02B 6/08; G02B 2027/011; G02B 2027/013;
(Continued)

(56) References Cited

U.S. PATENT DOCUMENTS

| | | | | |
|---|---|---|---|---|
| 3,878,329 A | * | 4/1975 | Brown | H01J 29/80 348/51 |
| 4,127,322 A | * | 11/1978 | Jacobson | H04N 9/3105 348/761 |

(Continued)

FOREIGN PATENT DOCUMENTS

| | | |
|---|---|---|
| EP | 2848449 A1 | 3/2015 |
| WO | WO 2012/037290 A2 | 3/2012 |
| WO | WO-2015/136258 A1 | 9/2015 |

OTHER PUBLICATIONS

International Searching Authority, International Search Report and Written Opinion for International Application No. PCT/SE2016/050001, dated Nov. 17, 2016, 10 pages, Swedish Patent and Registration Office, Sweden.

(Continued)

*Primary Examiner* — Jennifer Doan
(74) *Attorney, Agent, or Firm* — Alston & Bird LLP

(57) ABSTRACT

The present disclosure relates devices and a method for monitoring a display image (2) in a transparent optical projection display. They disclose a display image monitor (1) comprising a fiber optic face plate (4) and an image sensor (5). The fiber optic face plate (4) comprises a first surface (4a) with optic fiber ends and a second surface (4b) with corresponding optic fiber ends and transfers light from the first surface (4a) to the second surface (4b) through the optic fibers, wherein the first surface abuts against a part (2a) of the display image (2) at a focused image plane (2b) and thus the light of the part of the display image enters the optic fiber ends and wherein the second surface is arranged to direct the part of the display image to the image sensor, thereby transferring the part of the display image to the image sensor.

22 Claims, 7 Drawing Sheets

(51) Int. Cl.
*G02B 5/02* (2006.01)
*G02B 6/08* (2006.01)
*G02C 7/08* (2006.01)

(52) U.S. Cl.
CPC ........ *G02C 7/086* (2013.01); *G02B 2027/011* (2013.01); *G02B 2027/013* (2013.01); *G02B 2027/014* (2013.01); *G02B 2027/0138* (2013.01)

(58) Field of Classification Search
CPC ...... G02B 2027/0138; G02B 2027/014; G02B 6/00; G02C 7/086; G01L 1/246; G01L 1/242; G01K 11/3206; G01N 21/7703
See application file for complete search history.

(56) References Cited

U.S. PATENT DOCUMENTS

| | | | | |
|---|---|---|---|---|
| 5,035,474 A | * | 7/1991 | Moss | G02B 27/01 359/13 |
| 5,760,403 A | * | 6/1998 | Elabd | H04N 5/217 250/370.09 |
| 5,886,822 A | * | 3/1999 | Spitzer | G02B 27/0172 359/630 |
| 2006/0028400 A1 | | 2/2006 | Lapstun et al. | |
| 2008/0069505 A1 | * | 3/2008 | Reichel | G02B 6/08 385/120 |
| 2011/0102874 A1 | | 5/2011 | Sugiyama et al. | |
| 2011/0293231 A1 | * | 12/2011 | van Bommel | G02B 6/06 385/120 |
| 2013/0004967 A1 | * | 1/2013 | Halverson | B01L 3/50853 435/7.8 |
| 2013/0093861 A1 | * | 4/2013 | Itoh | G02B 3/06 348/51 |
| 2014/0043320 A1 | * | 2/2014 | Tosaya | G02B 27/0172 345/419 |
| 2015/0169049 A1 | | 6/2015 | Ko et al. | |
| 2015/0370011 A1 | | 12/2015 | Ishihara | |

OTHER PUBLICATIONS

European Patent Office, European Search Report for European Patent Application No. 16884069.2, dated Aug. 2, 2019, (7 pages), Stockholm, Sweden.

* cited by examiner

FACE PLATE IN TRANSPARENT OPTICAL PROJECTION DISPLAYS

CROSS REFERENCE TO RELATED APPLICATIONS

This application is a National Stage Application, filed under 35 U.S.C. § 371, of International Application No. PCT/SE2016/050001, filed Jan. 5, 2016; the contents of which as are hereby incorporated by reference in their entirety.

BACKGROUND

Related Field

The present disclosure relates devices and a method for monitoring a display image in a transparent optical projection display. In particular the disclosure relates to devices and a method related to transparent optical projection displays, for monitoring the display image with a fiber optic face plate and an image sensor.

Description of Related Art

It is important that displays, especially transparent optical projection displays such as Head Up Displays, HUD, or Helmet Mounted Displays, HMD, show right information for a commander of a vehicle, such as a pilot of an aircraft. If the information on the display is misleading, this could result in fatal maneuvers. Examples of misleading information are wrong height information, wrong targeting information or a wrong horizon. An example of wrong height information is if a height of 1,000 foot instead of a real height of 7,000 foot would be displayed. Further misleading operation could be that important symbols overlap so that they are not readable, or at least not readable without any difficulties. Other examples of misleading information are misplaced symbols or symbols which are not placed at all.

To avoid that such misleading information is displayed, authorities responsible for aircrafts or air traffic have strict standards regarding functioning and controlling of graphic processing units, GPU. Developing GPUs which fulfil these standards and documenting these GPUs, or proving that these GPUs work as intended is, however, time and cost intensive.

In the recent years, commercial of-the-shelf, COTS, graphic processing units, GPU have become more and more powerful. Today, they have similar or often even higher performance than GPUs which are especially developed for aircraft industries. A disadvantage of these COTS GPUs is, however, that their internal structure often is not publicly available, so that a documented proof of their functionality, resulting in a certification for aircraft use, is not possible.

Therefore, in addition to preventing the obvious security issues with displaying the wrong information there is also a need to assure correct displaying for COTS GPUs in aircrafts to be able to use COTS GPU in aircrafts, and thus drastically lowering construction costs.

Traditionally, the generation of graphics is monitored by letting the GPU internally check for errors in the output image. This gives information regarding the functioning of the GPU but in the case of a malfunctioning GPU, errors in the displayed image may be missed.

There is always a need to improve the process to check for errors in the image for display to the pilot.

BRIEF SUMMARY

An object of the present disclosure is to provide devices and a method which seek to mitigate, alleviate, or eliminate one or more of the above-identified deficiencies in the art and disadvantages singly or in any combination.

In this disclosure, a solution to the problem outlined above is proposed. In the proposed solution a face plate is utilized. The solution is based on the below described techniques that uses a face plate to transfer a predetermined number of pixels from the displayed image to an image sensor to determine if there is any kind of error in the pixels.

The above objects are obtained by a display image monitor for monitoring a display image in a transparent optical projection display. The display image monitor comprises a fiber optic face plate and an image sensor, wherein the fiber optic face plate comprises a first surface with optic fiber ends and a second surface with corresponding optic fiber ends and is adapted to transfer light from the first surface to the second surface through the optic fibers, wherein the first surface abuts against a part of the display image at a focused image plane and thus the light of the part of the display image enters the optic fiber ends and wherein the second surface is arranged to direct the part of the display image to the image sensor, thereby transferring the part of the display image from the focused image plane to the image sensor. By providing a display image monitor which has a fiber optic face plate and an image sensor, and where the face plate transfers the part of the display image from a location where the display image is in focus, a way to check the part of the image for errors is provided.

According to some aspects, the part of the display image abutting against the first surface is located at the edge of the display image at the focused image plane. Thus the translation of the part of the image using the face plate intrudes minimally on the display image.

According to some aspects, the second surface abuts against the image sensor. When the second surface of the face plate abuts against the image sensor, the transferred part of the display image is directly entered into the image sensor and any potential additions of errors between the face plate and image sensor are avoided.

According to some aspects, the image sensor is a one dimensional array of photoelectrical sensors, a two dimensional array of photoelectrical sensors or a camera. The image sensor is chosen depending on the size of the part of the image display or on the type of information that is checked for in the transferred part.

According to some aspects, the display image monitor further comprises an analyzing unit configured to receive sensor data associated with the part of the display image from the image sensor and to analyze the sensor data. Hence, the part of the display image is checked in the analyzing unit.

According to some aspects, wherein the image sensor comprises two or more image sensors and the fiber optic face plate comprises two or more fiber optic face plates, each abutting against a separate part of the display image at a focused image plane, wherein each fiber optic face plate transfers the corresponding part of the display image from the focused image plane to a corresponding image sensor. The two different display image monitors for example checks for different types of errors in the display image. They may also be used to check if the same errors appear in both places.

The objects of the disclosure are further obtained by a transparent optical projection display for monitoring a display image. The transparent optical projection display comprises a combiner system, an image producing arrangement and a display image monitor comprising a fiber optic face plate and an image sensor, wherein the fiber optic face plate comprises a first surface with optic fiber ends and a second surface with corresponding optic fiber ends and is adapted to transfer light from the first surface to the second surface through the optic fibers, wherein the first surface abuts against a part of the display image at a focused image plane and thus the light of the part of the display image enters the optic fiber ends and wherein the second surface is arranged to direct the part of the display image to the image sensor, thereby transferring the part of the display image from the focused image plane to the image sensor. By providing a display image monitor which has a fiber optic face plate and an image sensor in a transparent optical projection display, a compact system for checking for errors in the display image of the transparent optical projection display is provided.

According to some aspects, the part of the display image abutting against the first surface is located at the edge of the display image at the focused image plane. The advantage of this is the same as the corresponding feature for the display image monitor.

According to some aspects, the second surface abuts against the image sensor. The advantage of this is the same as the corresponding feature for the display image monitor.

According to some aspects, the image sensor is a one dimensional array of photoelectrical sensors, a two dimensional array of photoelectrical sensors or a camera. The advantage of this is the same as the corresponding feature for the display image monitor.

According to some aspects, the display image monitor further comprises an analyzing unit configured to receive sensor data associated with the part of the display image from the image sensor and to analyze the sensor data. The advantage of this is the same as the corresponding feature for the display image monitor.

According to some aspects, the focused image plane is a focused image plane between the image producing arrangement and the combiner system. Thus, the part of the display image is collected by the face plate at a location in the transparent optical projection display system where it does not intrude in the field of view of the pilot using the transparent optical projection display.

According to some aspects, the transparent optical projection display comprises a diffusor unit between the image producing arrangement and the combiner system and wherein the focused image plane is the focused image plane at the diffusor unit of the transparent optical projection display. The diffusor unit in a transparent optical projection display system is normally located at the focused image plane of the display image between the image producing unit and the combiner system. Hence, the face plate is located at the diffusor unit of the transparent optical projection display.

According to some aspects, the diffusor unit comprises a fiber optic face plate wherein a subset of the optic fibers of the fiber optic face plate are arranged to direct the part of a focused image plane of the display image to the image sensor. Hence, the whole diffusor unit is a face plate and a subset of the fibers of the face plate directs the part of the display image to the image sensor.

According to some aspects, the diffusor unit comprises two optical lenses and the fiber optic face plate is located next to the edge of the diffusor unit. In other words, the face plate collects the part of the display image at the edge of the image since the optical lenses are collecting most of the image and the face plate is located at the edge of them.

According to some aspects, the image sensor comprises two or more image sensors and the fiber optic face plate comprises two or more fiber optic face plates, each abutting against a separate part of the display image at a focused image plane, wherein each fiber optic face plate transfers the corresponding part of the display image from the focused image plane to a corresponding image sensor. The advantage of this is the same as the corresponding feature for the display image monitor.

The objects of the disclosure is further obtained by a method performed in a transparent optical projection display for monitoring a display image, the transparent optical projection display comprising a combiner system, an image producing arrangement, and a display image monitor comprising a fiber optic face plate and an image sensor. The method comprises transferring at least one part of a display image of the transparent optical projection display at a focused image plane to the image sensor using the fiber optic face plate and analyzing the sensor data of the at least one part of the display image from the image sensor. Hence, an effective way of transferring the part of the image is provided. Since the part of the image is transferred from a focused plane of the display image, good quality of the part of the display image is achieved. A face plate can be made very slim compared to an optical system performing a similar task and thus does not take up much space which is especially important in cock pits.

According to some aspects, analyzing the sensor data of the at least one part of the display image from the image sensor comprises to determine whether there are any errors in the at least one part of the display image. Thus, errors can be detected accurately and efficiently.

According to some aspects, to determine whether there are any errors in the part of the display image comprises to compare a number of predetermined pixels with predetermined light emission to the sensor data of the same predetermined pixels. In other words, predetermined pixels are used to check for errors. Errors can thus be located fast and accurately by comparing the predetermined pixels light emission to the sensor data of the same pixels.

According to some aspects, the errors comprise frozen pixels. In other words, the method provides a way to detect frozen pixels in the display image.

According to some aspects, when errors are detected the image producing arrangement is restarted. Hence, the errors are likely taken care of by the restart.

The following aspects comprise different ways to analyze the sensor data. All aspects separately have the effect that different kinds of problems with the display image can be detected.

According to some aspects, analyzing the sensor data of the at least one part of the display image comprises to locate specific boresight test points to perform bore sighting.

According to some aspects, analyzing the sensor data of the at least one part of the display image comprises to determine that the at least one part of the display image is in focus. According to some aspects, analyzing the sensor data of the at least one part of the display image comprises to determine a symbol position accuracy.

According to some aspects, analyzing the sensor data of the at least one part of the display image comprises to determine the intensity on the pixels of the at least one part of the display image.

According to some aspects, the disclosure also relates to a computer program comprising computer program code which, when executed in a programmable controller of a transparent optical projection display, causes the transparent optical projection display to execute the methods described above and below.

BRIEF DESCRIPTION OF THE FIGURES

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION OF VARIOUS EMBODIMENTS

Figure 1:
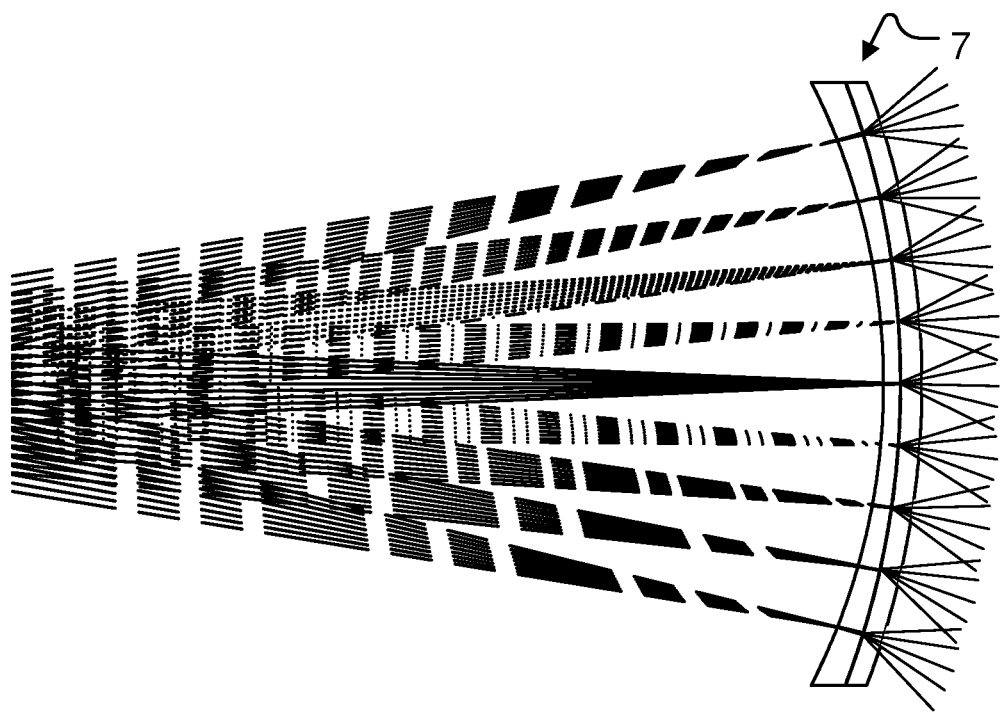
FIG. 1 illustrates an example of a diffusor unit which comprises of two meniscus lenses and wherein the focused image is located in the spacing between the two lenses.

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the term transparent optical projection display relates to all types of transparent displays with optical projection. Such displays are for example Head Up Displays, HUDs, or Helmet Mounted Displays, HMDs. The disclosed technology is sometimes throughout the description described using a HUD system as an example but it should be understood that the disclosed technology is equally applicable to all types of transparent optical projection displays.

As described in the background, there is a need for improvement on the system to check the image to be displayed to the user of the transparent optical projection display. The test patterns in transparent optical projection display systems are today checked with different optical solutions which are often very space consuming in the technology crowded cock pit of an airplane or a helicopter.

There are in general two locations in a transparent optical projection display where the display image to be seen by the pilot can be accessed. Firstly, the display image can be accessed at an intermediate image plane between the image producing arrangement and the combiner system. Secondly, the display image can be accessed in a location where the viewer of the display image is intended to be. It is common that a diffusor unit is used in the intermediate image plane to diffuse the display image before the combiner system; however, it is not necessary. An example of a diffusor unit is shown in FIG. 1 and consists of two optical lenses. The focused image plane is located between the two lenses. The one or both lens surfaces facing the intermediate spacing between the lenses are diffusing and the spacing is small enough for the image to be well enough focused (as determined by system performance requirements) on both surfaces. In this example, it is not possible to access the focused image plane, i.e. the intermediate image plane, since the lenses are in the way. FIG. 1 shows an example where the intermediate image plane is surrounded by optical components, which illustrates a case where it is difficult to access the image plane.

Figure 2:
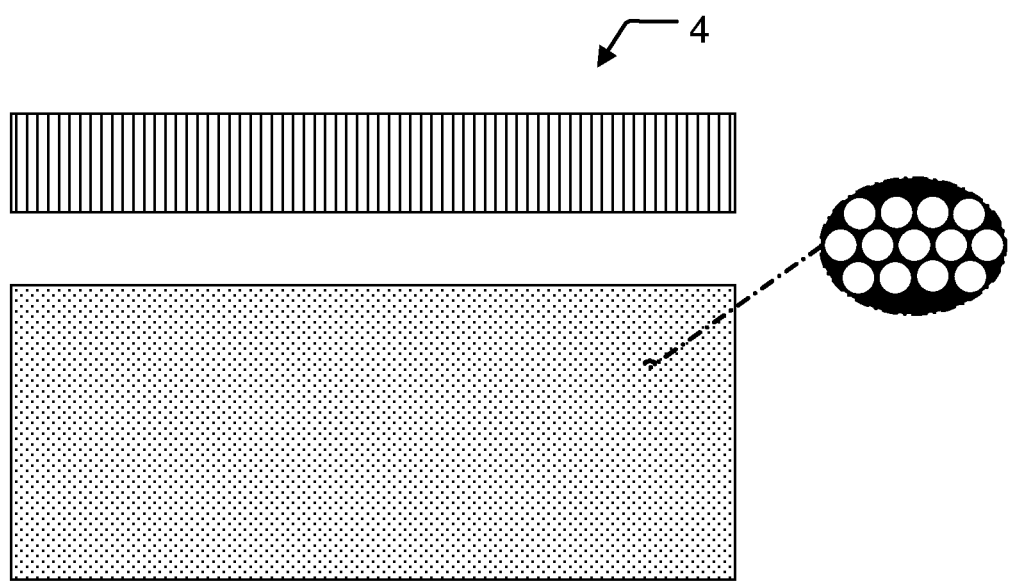
FIG. 2 illustrates the fibers in an example of a fiber optic face plate. The top part illustrates the face plate fibers from the side and the bottom part illustrates the fibers from a top or bottom view. The bottom part shows a magnified cut out of the fibers.
Figure 3:
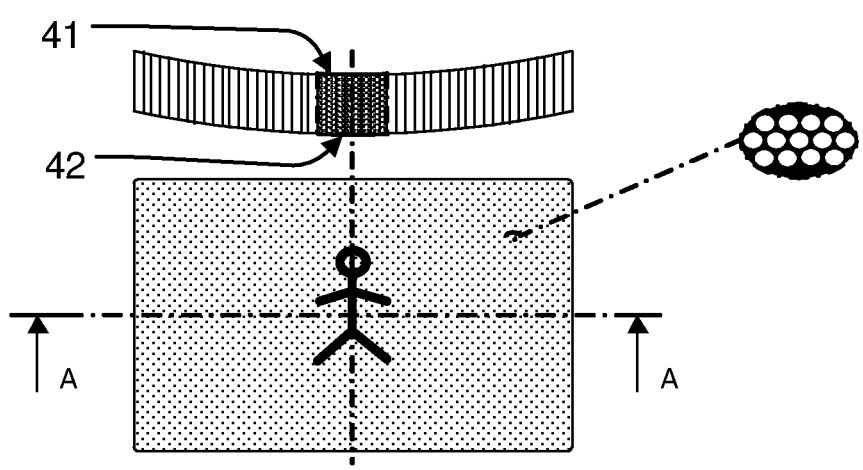
FIG. 3 illustrates the projection of an image in a fiber optic face plate according to an example.

The disclosure relates to a way to access the focused image plane of the display image without intruding in the users/pilots field of view more than necessary given that some image pixels are used for image analysis. The part of the display image, i.e. the intermediate image which is used for image analysis, may lie within the possible Field Of View, FOV, of the system, or may be blocked by the following optical system, e.g. relay optics or combiner optics. The disclosure describes a transparent optical projection display which uses a fiber optic face plate to divert a part of the display image to be analyzed in an image sensor, without the need for any further imaging optics. The concept of fiber optic face plates is illustrated in FIGS. 2 and 3. FIG. 2 illustrates a face plate 4 from the side in the top part and from above or below in the bottom part. The horizontal lines in the top part are the fibers seen from the side. The dots in the bottom part are the ends of the fibers as can be seen in the enlarged cut out.

FIG. 3 shows an example of a transfer of an image plane at one surface of a face plate to the other surface of the face plate, the face plate surfaces in this example both being curved. An image is projected onto a concave surface 41 of the face plate and transferred to a convex surface 42 thus translating, i.e. transferring, the image plane position without optical refraction. Also, the image plane curvature could be changed, e.g. from curved to flat or any desired surface topology, including magnification through tapering of the fibers. The resulting image in the convex surface is shown in the bottom part of FIG. 3. In FIG. 3, A shows the location of the cross section showed in the second view, at the top of the figure. An alternative description of a face plate is that it can be used to transfer an image point from one side of the face plate to the other which is a good way to transfer an image without affecting the focus of the image. To achieve the same effect with conventional optical elements, an extensive optical system is needed with side effects such as geometrical distortion.

The orientation of the fibers in a face plate has the effect that a linear transfer of an image is possible. It is important that the number of fibers in the face plate is large enough to keep a good resolution in the transferred image. In the transferred image the resolution will be one image point per fiber. In other words, the number of fibers and the thickness of the fibers affect the resolution of the transferred image. The required number of fibers then of course depends on the required resolution of the transferred image; i.e. the configuration of the fibers in the face plate is chosen such that the resolution in the transferred image suits the purpose of use for the transferred image.

Figure 4:
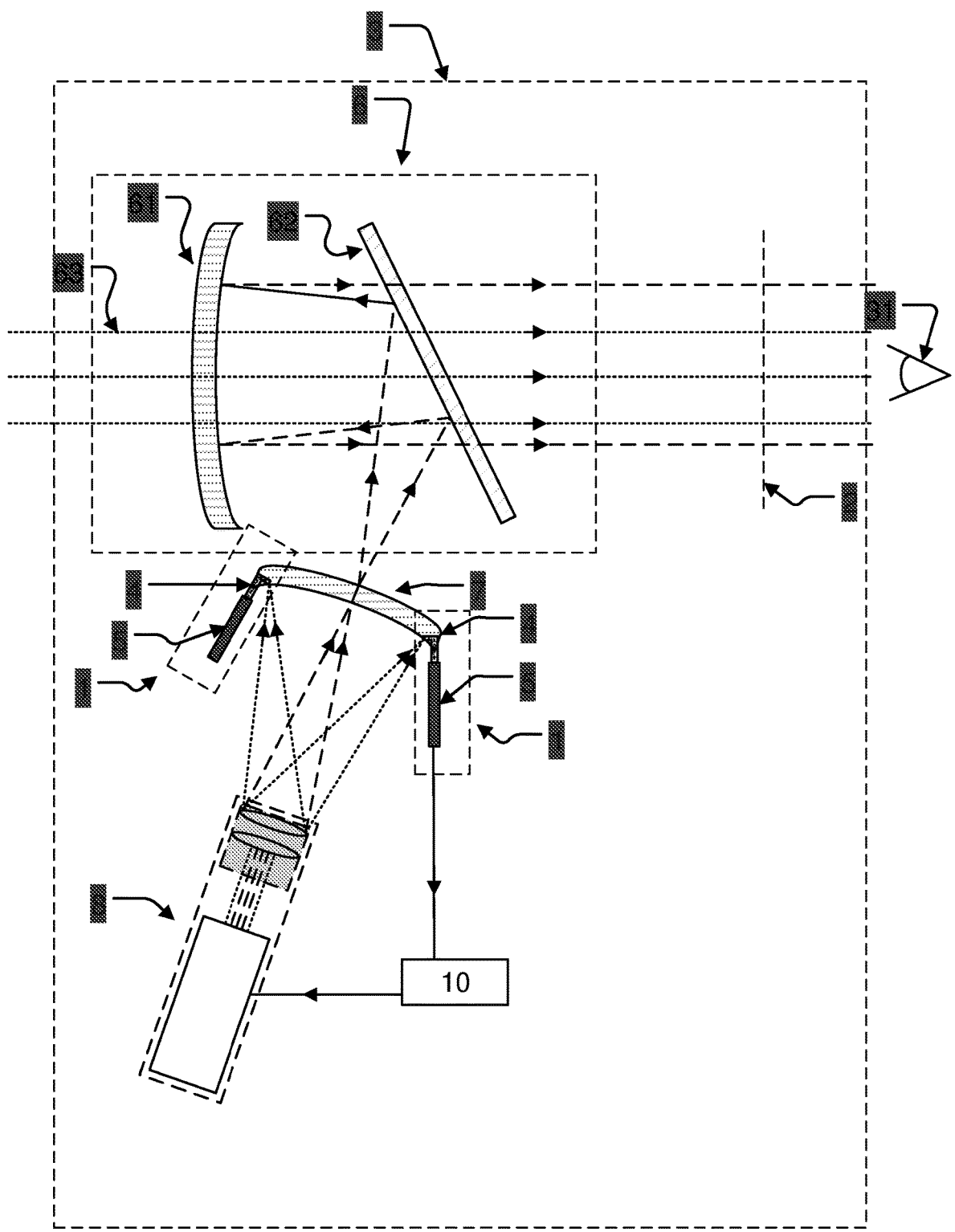
FIG. 4 illustrates a transparent optical projection display with a display image monitor according to an example embodiment of the disclosure.

FIG. 4 illustrates an example of a transparent optical projection display 3, in this case in the form of a Head Up Display according to some aspects of the disclosure. The above discussed objects of the disclosure is achieved by a display image monitor 1 and a transparent optical projection display comprising the display image monitor 1 for monitoring a display image 2. They are also achieved by a method performed in the transparent optical projection display. The transparent optical projection display comprises a combiner system 6, an image producing arrangement 8 and a display image monitor 1 comprising a fiber optic face plate 4 and an image sensor 5.

The combiner system 6 in FIG. 4 in a transparent optical projection display, such as a HUD, typically comprises a combiner which is provided with a flat, spherical, or slightly aspherical, semi-transparent mirror 61 arranged relatively to a diffusor unit 7 such that a center of an intermediate display image on said diffusor unit 7 comes on the optical axis (on-axis configuration) of the mirror 61. The optical axis is folded between the intermediate display image in the diffusor unit and the collimating mirror 61 by a semi-transparent folding flat mirror 62. The collimated rays from the collimating mirror 61 and rays from the background 63 are transmitted through this semi-transparent mirror 61 to the eyes 31 or to a pair of night vision goggles. This means that some of the volume is passed twice or even three times by rays on their way from the display image to the eyes. This is a feature for achieving small outer dimensions of the transparent optical projection display system. It should be noted that not all transparent optical projection displays comprises a diffusor unit. The diffusor unit is not necessary if the cone of light after the intermediate image plane is already large enough that the eye box is filled out, or the eye box is small enough (unless vignetted in the relay optics and/or size of combiner and beamsplitter). If relay optics other than the combiner is used, the combiner might be flat. Off axis transparent optical projection display configurations are also possible, including a relay objective and a curved combiner surface.

The image producing arrangement 8 is for example a graphic processing unit, GPU. The image producing arrangement may comprise any kind of image producing arrangement suitable for use in a transparent optical projection display.

Different set ups with the fiber optic face plate are illustrated in FIGS. 4 to 8. The different set ups will be further discussed below.

To be able to monitor the display image, a display image monitor 1 for monitoring a display image 2 in a transparent optical projection display 3 is provided. The display image monitor 1 comprises a fiber optic face plate 4 and an image sensor 5. According to some aspects, the image sensor is a one dimensional array of photoelectrical sensors, a two dimensional array of photoelectrical sensors or a camera. The image sensor is chosen depending on the size of the part of the image display or on the type of information that is checked for in the transferred part. The image sensor may be any image sensor which is capable of analyzing an image but there may be requirements on for example resolution capabilities.

The fiber optic face plate 4 comprises a first surface 4a with optic fiber ends and a second surface 4b with corresponding optic fiber ends and is adapted to transfer light from the first surface 4a to the second surface 4b through the optic fibers, wherein the first surface 4a abuts against a part 2a of the display image 2 at a focused image plane 2b and thus the light of the part 2a of the display image 2 enters the optic fiber ends. The second surface 4b is arranged to direct the part 2a of the display image 2 to the image sensor 5, thereby transferring the part 2a of the display image 2 from the focused image plane to the image sensor 5. In other words, a face plate transfers, or translates, a number of image points from the focused display image to the image sensor. Thus, the part of the display image received by the image sensor is in focus; i.e. the same focus as of the image shown to the user of the transparent optical projection display. It is important that the first surface of the fiber optic face plate abuts against the focused part of the display image as the image will be transferred in the same focus as it was collected in. In other words, the level of focus of the image entering the face plate at the first surface will be the same as in the image exiting at the second surface. By providing a display image monitor which has a fiber optic face plate and an image sensor, and where the face plate transfers the part of the display image from a location where the display image is in focus, a way to check the part of the image for, for example, errors is provided.

A display image monitor 1 in the form of a detector array element may be placed in direct contact with or very close to the face plate 4. This is for example illustrated in FIG. 4. A camera on the other hand, or a detector array element together with some imaging optics, may be placed at a distance from the fiber optic face plate.

By providing a display image monitor 1 which has a fiber optic face plate 4 and an image sensor 5 in a transparent optical projection display 3, a compact system for checking for errors in the display image of the transparent optical projection display is provided. It should be noted that imaging optics may be used between the second surface 4b and the image sensor 5.

So as to not intrude in the field of view of the user of the transparent optical projection display, the focused image plane is, according to some aspects, a focused image plane between the image producing arrangement 8 and the combiner system 6. Thus, the part of the display image is collected by the face plate at a location in the transparent optical projection display system where it does not intrude in the field of view of the user, because the contributions from different image points do not overlap at an image plane, but everywhere else. The focused image plane between the image producing arrangement 8 and the combiner system 6 may also be referred to as an intermediate image plane as is also discussed above. This is the case illustrated in FIG. 4.

As previously described, a diffusor unit is not always used in transparent optical projection displays, but if there is a diffusor unit the transparent optical projection display comprises, according to some aspects, a diffusor unit 7 between the image producing arrangement 8 and the combiner system 6 and wherein the focused image plane is the focused image plane at the diffusor unit 7 of the transparent optical projection display. The diffusor unit in a transparent optical projection display system is normally located at the focused image plane of the display image between the image producing unit and the combiner system. Hence, the face plate is located at the diffusor unit of the transparent optical projection display.

Figure 5:
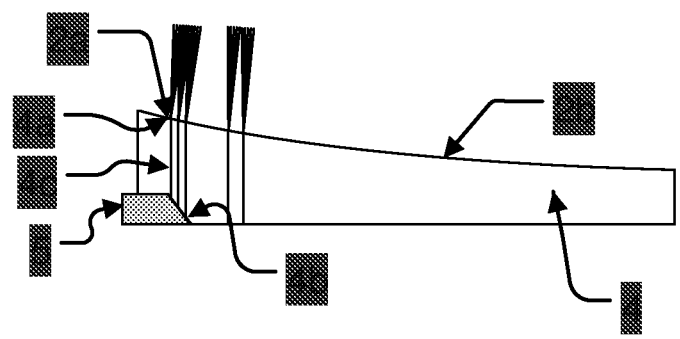
FIG. 5 illustrates a diffusor unit comprising a fiber optic face plate and with an image sensor in direct connection to the fiber optic face plate according to some aspects of the disclosure.

To for example convert the shape of the intermediate image plane as in the case with the diffusor unit according to FIG. 1 where the spherical image plane might for example be transformed into a flat image plane, depending on the requirements of the following optical system, the diffusor unit may comprise a fiber optic face plate 4 for image plane transformation. If diffusing is required, the fiber optic face plate may e.g. also include a diffusing surface immediately before or after the face plate or the face plate itself having either of its surfaces diffusing for the whole or part of the surface. In other words, according to some aspects, the diffusor unit 7 comprises a fiber optic face plate 4 wherein a subset 4c of the optic fibers of the fiber optic face plate 4 are arranged to direct the part of a focused image plane of the display image 2 to the image sensor 5. Hence, the diffusor unit has a face plate and a subset of the fibers of the face plate directs the part of the display image to the image sensor. Such a diffusor unit is illustrated in FIG. 5, where the diffusor unit comprises a fiber optic face plate. As discussed above, if diffusing is required a diffusing surface is needed. The focused display image 2b enters at the first surface 4a of the face plate and the second surface 4b in this case abuts directly against the image sensor 5. Hence, according to some aspects, the second surface 4b abuts against the image sensor 5. When the second surface of the face plate abuts against the image sensor, the transferred part of the display image is directly entered into the image sensor and any potential additions of errors between the face plate and image sensor are avoided.

Figure 6:
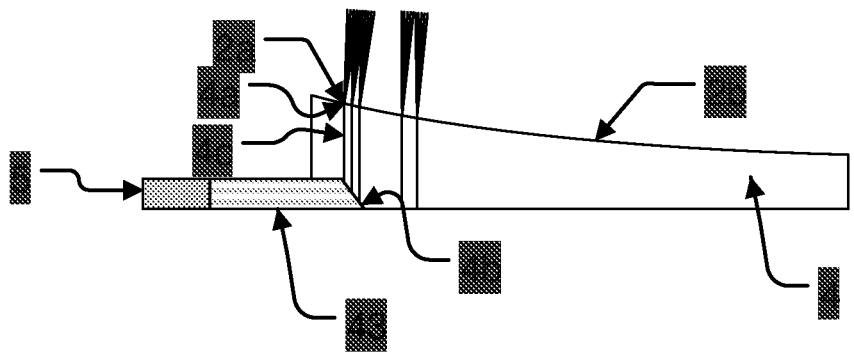
FIG. 6 illustrates a diffusor unit comprising a fiber optic face plate and with an image sensor in direct connection to a second fiber optic face plate in direct connection to the fiber optic face plate according to some aspects of the disclosure.

The fibers sensor may be bent to direct the part of the display image to the image sensor. According to some aspects a second fiber optic face plate 43 is abutting the second surface 4b of the face plate which directs the part of the display image to the image sensor. Such an example embodiment is illustrated in FIG. 6. The example embodiment where a second fiber optic face plate is used in connection to the first fiber optic face plate can of course also be used when not using a diffusor unit.

It should be noted that a transparent optical projection display system may use a unit such as the one described above as the diffusor unit but without the diffusing part. Such a unit may be beneficial if there is a need to transform the intermediate image plane in another way than diffusing it. For example, the location, curvature, topology or size of the image plane might be transformed.

Figure 7:
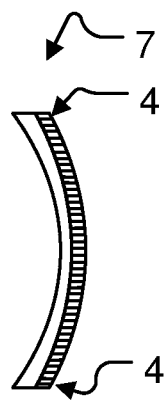
FIG. 7 illustrates a diffusor unit with half of the unit being an optical lens and the other half being a fiber optic face plate according to an example embodiment of the disclosure.
Figure 8:
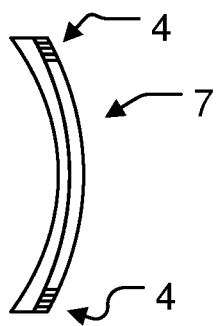
FIG. 8 illustrates a diffusor unit with two optical lenses and two fiber optic face plates at the edges of the lenses according to an example embodiment of the disclosure.

Alternative configurations of the diffusor unit are illustrated in FIGS. 7 and 8. FIG. 7 illustrates an example embodiment where the second half of the diffusor unit 7 comprises a fiber optic face plate. A part or parts of the face plate may then be directed towards the image sensor as in the example embodiment described in connection to FIGS. 5 and 6. Hence, another way to minimize the intrusion by the image display monitor in the display image is to let the part 2a of the display image 2 abutting against the first surface 4a be, according to some aspects, located at the edge of the display image 2 at the focused image plane. Thus the transfer of the part of the image using the face plate intrudes minimally on the display image because a part on the edge is used. It should be noted that FIGS. 7 and 8 illustrates two face plates 4 but according to the disclosure, the number of face plates is optional to the system designer. I.e. it may be one face plate 4 or more than one.

In FIG. 4, the fiber optic face plate 4 is illustrated as to be located on the edge of the diffusor unit and with a bent face plate. It has no impact on the quality of the transferred image whether the fiber optic face plate is bent or not; it just depends on how it is most practical to have it. According to some aspects, the diffusor unit 7 comprises two optical lenses and the fiber optic face plate 4 is located next to the edge of the diffusor unit. In other words, the face plate collects the part of the display image at the edge of the image since the optical lenses are collecting most of the image and the face plate is located at the edge of them. FIG. 8 shows an example embodiment where the fiber optic face plate 4 is located at the edge of the diffusor unit 7. In the figure, the fiber optic face plate abuts against the backside, in the optical path of the system, of the first lens and is located at the edge of the second lens. Note that the fibers do not need to be straight as in the figures, but may be bent. The setup of the system will determine whether it is best to have straight or bent fibers depending on where the image sensor 5 is located.

Figure 9:
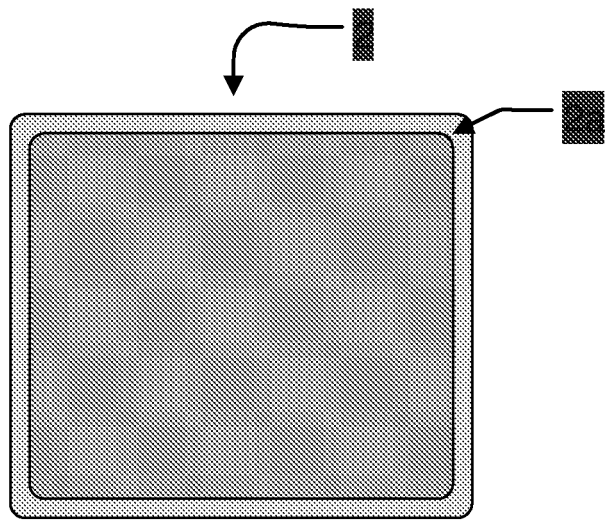
FIG. 9 illustrates a display image with the edges of the image being the part transferred to the image sensor according to an example embodiment of the disclosure.

FIG. 9 illustrates a display image 2 at the intermediate image plane with the part 2a of the display image marked. In this example embodiment, the part transferred to the image sensor comprises the edge all the way around the display image.

To be space efficient and avoid transferring signals to external units, the display image monitor 1 illustrated in FIG. 4 further comprises, according to some aspects, an analyzing unit configured to receive sensor data associated with the part 2a of the display image 2 from the image sensor 5 and to analyze the sensor data. Hence, the part of the display image is checked in the analyzing unit. What is checked for is described further below when discussing the method of the transparent optical projection display.

For increased security there might be a case when two or more parts of the display image needs to be checked. So according to some aspects, the image sensor 5 comprises two or more image sensors 5 and the fiber optic face plate 4 comprises two or more fiber optic face plates 4, each abutting against a separate part 2a of the display image 2 at a focused image plane, wherein each fiber optic face plate 4 transfers the corresponding part 2a of the display image 2 from the focused image plane to a corresponding image sensor 5. The two different display image monitors for example checks for different types of errors in the display image. They may also be used to check if the same errors appear in more than one place. According to some aspects, there are two or more face plates 4 abutting against separate parts 2a of the display image 2 which transfers the parts 2a to one image sensor 5. In other words, there is more than one face plate and the fibers of the face plates are brought together to transfer their corresponding parts 2a to a single image sensor 5.

The objects of the disclosure are further obtained by a method performed in the transparent optical projection display 3 for monitoring a display image 2. The transparent optical projection display, as described above, comprises a combiner system 6, an image producing arrangement 8 and a display image monitor 1 comprising a fiber optic face plate 4 and an image sensor 5.

Figure 11:
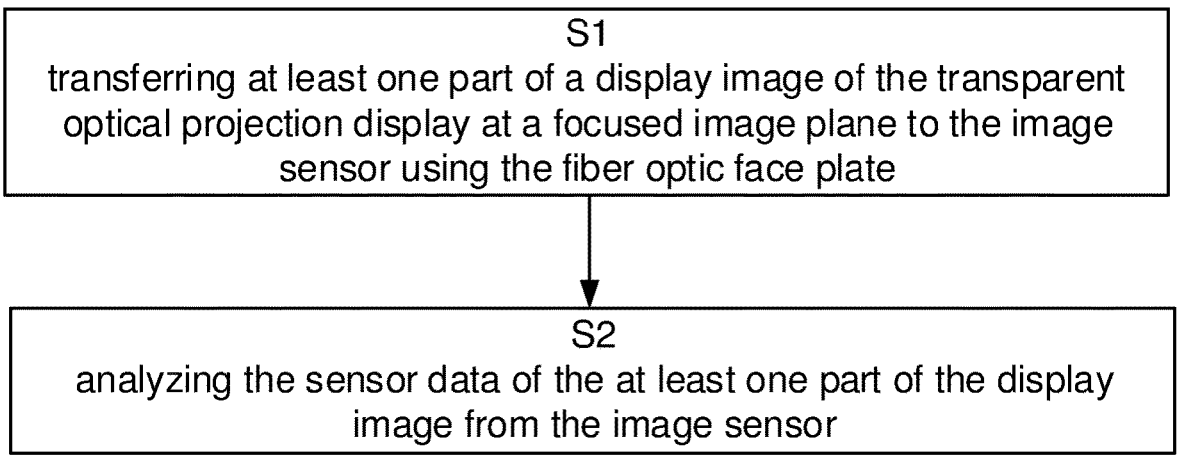
FIG. 11 is a flow chart illustrating the proposed method, performed in the transparent optical projection display.

The method is illustrated in FIG. 11. The method comprises transferring S1 at least one part 2a of a display image 2 of the transparent optical projection display at a focused image plane 2b to the image sensor 5 using the fiber optic face plate 4 and analyzing S2 the sensor data of the at least one part 2a of the display image 2 from the image sensor 5. Hence, an effective way of transferring the part of the image is provided. Since the part of the image is transferred from a focused plane of the display image, good quality of the part of the display image is achieved. A face plate can be made very slim compared to an optical system performing a similar task and thus does not take up much space which is especially important in cock pits. The setup of the transparent optical projection display has been previously described and will not be described again.

Figure 10:
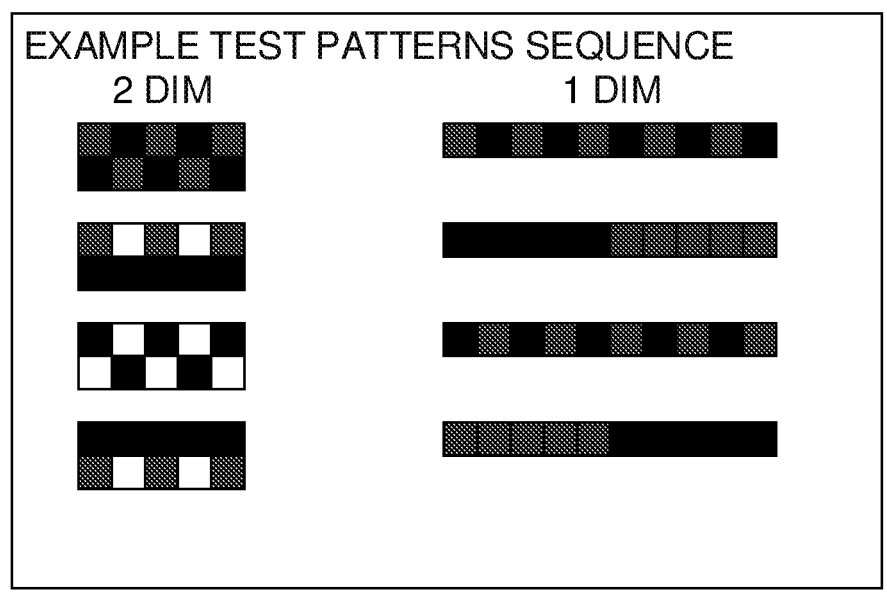
FIG. 10 illustrates examples of test pattern sequences to be displayed in the part of the image display.

Analyzing S2 the sensor data of the at least one part 2a of the display image 2 from the image sensor 5 comprises, according to some aspects, to determine whether there are any errors in the at least one part of the display image 2. Thus, errors can be detected accurately and efficiently. According to some aspects, to determine whether there are any errors in the part of the display image 2 comprises to compare a number of predetermined pixels with predetermined light emission to the sensor data of the same predetermined pixels. In other words, predetermined pixels projected by the image producing arrangement are used to check for errors. Errors can thus be located fast and accurately by comparing the predetermined pixels light emission to the sensor data of the same pixels. Predetermined pixels with predetermined light emission patterns is illustrated in FIG. 10. The patterns may be referred to as test patterns. The analysis of the sensor data of the pixels determines whether the sensor data of the pixels matches the test pattern. In other words, the image producing arrangement will, in the part 2a of the display image, project a predetermined test pattern which will be checked for in the image sensor to determine if there are any errors in the display image. The test patterns may also be that a number of pixels are blinking in a predetermined sequence. According to some aspects, the errors comprise frozen pixels. Frozen pixels are easily located in a blinking test pattern since in that case, at least one pixel will not blink. In other words, the method provides a way to detect frozen pixels in the display image and to make sure that the display image does not show old and outdated information; which is crucial in for example an aircraft or a helicopter. Another word for frozen pixel is stuck pixel.

According to some aspects, the test pattern is fed back to a unit for graphics generation and test pattern evaluation 10. The unit is illustrated in FIG. 4. It is up to the designer of the system to decide where the test patterns are evaluated and where the graphics are generated. Depending on the outcome of the analysis of the sensor data, the graphics generator may change the graphics to compensate for any errors or misalignments detected in the sensor data.

It should be noted that the predetermined pixels projected by the image producing arrangement may not be represented pixel by pixel in the sensor data. Depending on the arrangement, e.g. size and density, of the fibers in the fiber optic face plate, the projected pixels may not be transferred pixel to pixel by the face plate. The sensor data may therefore for example comprise image points which represent more than one projected pixels and also parts of pixels. The sensor data may also comprise image points which only represent part of a pixel. In other words, a projected pixel will be translated to several image points in the sensor data. The checked test pattern must then compensate for this. How test patterns will translate to the image points in the sensor data may for example be known from the setup of the system or it may require some test runs or the system.

When errors are detected the image producing arrangement is, according to some aspects, restarted. Hence, the errors are likely taken care of by the restart. If the errors are not taken care of by the restart the display image is for example turned off so as to not display misleading information to the user of the transparent optical projection display.

The following aspects comprise different ways to analyze the sensor data. All aspects separately have the effect that different kinds of problems with the display image can be detected.

According to some aspects, analyzing S2 the sensor data of the at least one part 2a of the display image 2 comprises to locate specific boresight test points to perform bore sighting. Bore sighting involves locating boresight point(s) to align the image produced in the transparent optical projection display with the outside world, i.e. the real world.

According to some aspects, analyzing S2 the sensor data of the at least one part 2a of the display image 2 comprises to determine that the at least one part of the display image 2 is in focus. Here, with focus we mean "correct" focus, corresponding to a nominal virtual image distance, since at this plane, the beam from each image point is usually close to collimated and the "focusing" is made by the adaptation of the lens of the eye. In other words, in focus means the focus that is intended for the user and not necessarily perfect focus. Thus, an image "out of focus" might still give a sharp image to the viewer, but at the wrong virtual image distance. If a diffuser is used at the intermediate image plane, an out of focus image will be blurred also to the observer. Incorrect focus can also be caused by errors in the optics following the intermediate image plane. The image monitor can detect errors of the focusing at the nominal intermediate image plane. Even if the intention is that the fiber optic face plate is collecting the part 2a of the display image at a focused image plane, the display image may never be in proper focus. Detecting that the part of the display image is out of focus tells the system that the user of the transparent optical projection display also has an out of focus image, or an incorrect focus image. Steps to focus the display image can then be taken. The display image monitor can help in the focusing by continuously giving information regarding the focus based on the sensor data.

According to some aspects, analyzing S2 the sensor data of the at least one part 2a of the display image 2 comprises to determine a symbol position accuracy. This is used to for example check for rotational errors, magnification errors and/or scaling. Symbol position accuracy According to some aspects, the analyzing S2 the part of the display image 2 comprises to determine lateral and/or longitudinal image position.

According to some aspects, analyzing S2 the sensor data of the at least one part 2a of the display image 2 comprises to determine the intensity on the pixels of the at least one part 2a of the display image 2. Information regarding the intensity of the display image is useful, since it is important to know whether the user of the transparent optical projection display is able to see the display image.

According to some aspects the image producing arrangement has a dynamic control of the light. Using the above technology, the intensity of the light can be continuously monitored and the result of the monitoring can be used to make adjustments in the control of the light in the image producing arrangement.

According to some aspects, the disclosure also relates to a computer program comprising computer program code which, when executed in a programmable controller of the transparent optical projection display 3, causes the transparent optical projection display to execute the method described above and below. In other words, the disclosure also relates to a computer-readable storage medium, having stored there on a computer program which, when executed in a programmable controller of a transparent optical projection display 3, causes the transparent optical projection display to execute the methods described above and below. A computer-readable storage medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the method disclosed herein. The particular sequence of such executable instructions or associated data structures represents examples of corresponding acts for implementing the functions described in such steps or processes.

Within the context of this disclosure, the term fiber optic face plate is used interchangeably with face plate.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A device (1) for monitoring a display image (2) in a transparent optical projection display (3), the device (1) comprising:
   a fiber optic face plate (4);
   an analyzing unit; and
   an image sensor (5),
   wherein:
      the fiber optic face plate (4) comprises a first surface (4a) with optic fiber ends and a second surface (4b) with corresponding optic fiber ends and is adapted to transfer light from the first surface (4a) to the second surface (4b) through the optic fibers,
      the first surface (4a) abuts against a part (2a) of the display image (2) at a focused image plane (2b) and thus the light of the part (2a) of the display image (2) enters the optic fiber ends,
      the second surface (4b) is arranged to direct the part (2a) of the display image (2) to the image sensor (5), thereby at least one of translating or transferring the part (2a) of the display image (2) from the focused image plane to the image sensor (5), and
      the analyzing unit is configured to receive sensor data associated with the part (2a) of the display image (2) from the image sensor (5) and to analyze the sensor data.

2. The device according to claim 1, wherein the part (2a) of the display image (2) abutting against the first surface (4a) is located at the edge of the display image (2) at the focused image plane.

3. The device according to claim 1, wherein the second surface (4b) abuts against the image sensor (5).

4. The device according to claim 1, wherein the image sensor is a one dimensional array of photoelectrical sensors, a two dimensional array of photoelectrical sensors, or a camera.

5. The device according to claim 1, wherein:
   the image sensor (5) comprises two or more image sensors (5) and the fiber optic face plate (4) comprises two or more fiber optic face plates (4), each abutting against a separate part (2a) of the display image (2) at a focused image plane, and
   each fiber optic face plate (4) transfers the corresponding part (2a) of the display image (2) from the focused image plane to a corresponding image sensor (5).

6. A transparent optical projection display (3) for monitoring a display image (2), the display comprising:
   a combiner system (6);
   an image producing arrangement (8); and
   a device (1) comprising a fiber optic face plate (4), an analyzing unit, and an image sensor (5),
   wherein:
      the fiber optic face plate (4) comprises a first surface (4a) with optic fiber ends and a second surface (4b) with corresponding optic fiber ends and is adapted to transfer light from the first surface (4a) to the second surface (4b) through the optic fibers,
      the first surface (4a) abuts against a part (2a) of the display image (2) at a focused image plane (2b) and thus the light of the part (2a) of the display image (2) enters the optic fiber ends,
      the second surface (4b) is arranged to direct the part (2a) of the display image (2) to the image sensor (5), thereby translating/transferring the part (2a) of the display image (2) from the focused image plane to the image sensor (5), and
      the analyzing unit is configured to receive sensor data associated with the part (2a) of the display image (2) from the image sensor (5) and to analyze the sensor data to determine whether any errors exist in the part (2a) of the display image (2).

7. The transparent optical projection display according to claim 6, wherein the part (2a) of the display image (2) abutting against the first surface (4a) is located at the edge of the display image (2) at the focused image plane.

8. The transparent optical projection display according to claim 6, wherein the second surface (4b) abuts against the image sensor (5).

9. The transparent optical projection display according to claim 6, wherein the image sensor is a one dimensional array of photoelectrical sensors, a two dimensional array of photoelectrical sensors or a camera.

10. The transparent optical projection display according to claim 6, wherein the focused image plane is a focused image plane between the image producing arrangement (8) and the combiner system (6).

11. The transparent optical projection display according to claim 6, wherein:
the transparent optical projection display comprises a diffusor unit (7) between the image producing arrangement (8) and the combiner system (6); and
the focused image plane is the focused image plane at the diffusor unit (7) of the transparent optical projection display.

12. The display image monitor according to claim 11, wherein the diffusor unit (7) comprises a fiber optic face plate (4) wherein a subset (4c) of the optic fibers of the fiber optic face plate (4) are arranged to direct the part of a focused image plane of the display image (2) to the image sensor (5).

13. The transparent optical projection display according to claim 11, wherein the diffusor unit (7) comprises two optical lenses and the fiber optic face plate (4) is located next to the edge of the diffusor unit.

14. The transparent optical projection display according to claim 6, wherein:
the image sensor (5) comprises two or more image sensors (5) and the fiber optic face plate (4) comprises two or more fiber optic face plates (4), each abutting against a separate part (2a) of the display image (2) at a focused image plane, and
each fiber optic face plate (4) transfers the corresponding part (2a) of the display image (2) from the focused image plane to a corresponding image sensor (5).

15. A method performed in a transparent optical projection display (3) for monitoring a display image (2), the transparent optical projection display comprising a combiner system (6), an image producing arrangement (8), and a device (1) comprising a fiber optic face plate (4), an analyzing unit, and an image sensor (5), the device being arranged for monitoring the display image (2), the method comprising the steps of:

transferring (S1) at least one part (2a) of a display image (2) of the transparent optical projection display at a focused image plane (2b) to the image sensor (5) using the fiber optic face plate (4); and
analyzing (S2) the sensor data of the at least one part (2a) of the display image (2) from the image sensor (5) using the analyzing unit,
wherein the analyzing (S2) of the sensor data of the at least one part (2a) of the display image (2) comprises determining whether any errors exist in the at least one part (2a) of the display image (2).

16. The method according to claim 15, wherein to determine whether there are any errors in the part of the display image (2) comprises comparing a number of predetermined pixels with predetermined light emission to the sensor data of the same predetermined pixels.

17. The method according to claim 15, wherein the errors comprises frozen pixels.

18. The method according to claim 15, wherein when errors are detected the image producing arrangement is restarted.

19. The method according to claim 15, wherein the analyzing (S2) of the sensor data of the at least one part (2a) of the display image (2) further comprises locating specific boresight test points to perform bore sighting.

20. The method according to claim 15, wherein the analyzing (S2) of the sensor data of the at least one part (2a) of the display image (2) further comprises determining that the at least one part of the display image (2) is in focus.

21. The method according to claim 15, wherein the analyzing (S2) of the sensor data of the at least one part (2a) of the display image (2) further comprises determining a symbol position accuracy.

22. The method according to claim 15, wherein the analyzing (S2) of the sensor data of the at least one part (2a) of the display image (2) further comprises determining the intensity on the pixels of the at least one part (2a) of the display image (2).

* * * * *